(No Model.)

W. C. PARSELS.
HOSE COUPLING.

No. 331,998. Patented Dec. 8, 1885.

Witnesses:
John Blake
William W. Lambert

Inventor:
Wm. C. Parsels

UNITED STATES PATENT OFFICE.

WILLIAM C. PARSELS, OF ELLENVILLE, NEW YORK.

HOSE-COUPLING.

SPECIFICATION forming part of Letters Patent No. 331,998, dated December 8, 1885.

Application filed May 7, 1884. Serial No. 130,694. (No model.)

*To all whom it may concern:*

Be it known that I, WILLIAM C. PARSELS, a citizen of the United States, residing at Ellenville, in the county of Ulster and State of New York, have invented a new and useful Hose-Coupling, of which the following is a specification.

The object and nature of my invention is to furnish a less complicated, as well as one stronger and sooner adjusted, hose-coupler. I attain these results by the following description of my invention, reference being had to the accompanying drawings, in which—

Figure 1:
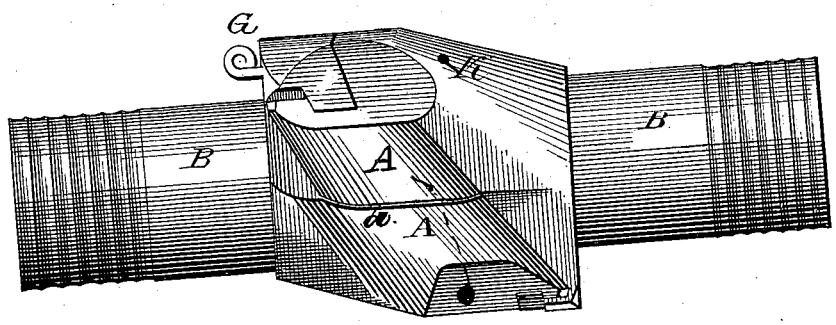
Figure 2:
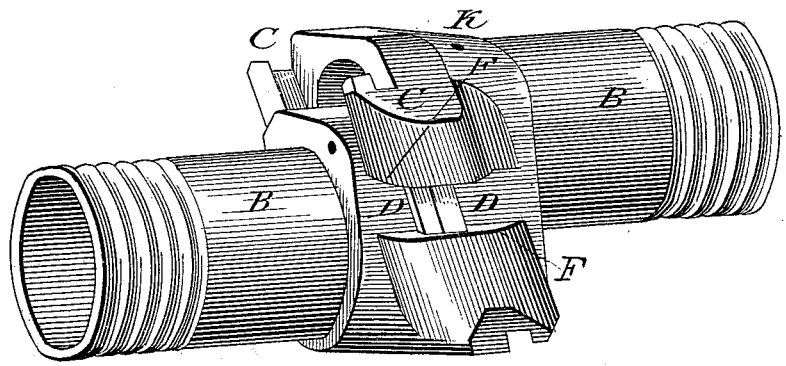
Figure 3:
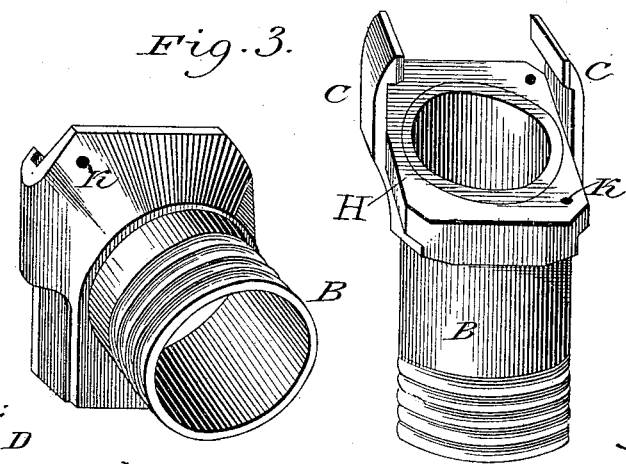

Figure 1 represents a pair of couplings joined; Fig. 2, a pair partly closed, when in Fig. 3 a single coupling is seen.

B B represent the ends of coupling, to which can be attached the hose.

A A represent two projecting flanges extending half-way across the face of the coupling-head, one on each side of the bore, each furnished with an inner slot or groove, C C, and when the two flanges are coupled the joint *a* is in direct longitudinal alignment with the heads B B.

D D represent two entering flanges in line with the flanges A A, and extending across the other half of the face of the coupling-heads B B on each side of bore to the center line thereof, the side flanges, A A, forming a shoulder or stop to each of the flanges D D at line F F. The flanges D D are fitted to slide into the grooves C C of the opposite coupling-head. On the face of each coupling-head, between the flanges and bore, is a circular dove-tailed groove, H, made to allow a ring-packing of rubber or other material to be inserted.

G is a key, to be inserted in socket R R, extending through both heads to lock them when closed or joined. The flanges and slots are beveled, so as the coupling-joint closes the faces are drawn tighter together. It will be seen that by having the faces and flanges at an angle with the hose that the more pressure put upon the hose the tighter the joint is drawn.

The operation of my coupling is simply to enter the flanges D D in slots or grooves C C, jam together, and enter key G, which same locks the joint. In disconnecting the same, by pulling out key, a jar by the boot-heel or a small mallet will separate them.

It will readily be seen that each part of my coupling by being one solid piece and each being made from the same pattern it does away with the necessity of keeping "male" and "female" ends of the hose together, for one is the exact duplicate of the other.

Having described my invention, what I claim as new, and desire to secure by Letters Patent, is—

1. In a hose-coupling, the combination of the heads B B, projecting flanges A A, mounted on said heads and extending half-way across the same, and having slots C C, entering flanges D D, and key G, entering holes K K, for securing the two parts together, whereby when the parts are secured in place a joint is formed having a direct longitudinal alignment with the center line of the heads, substantially as described.

2. As an article of manufacture, a hose-coupling consisting of heads B B, having projecting flanges A A, provided with slots C C, said flanges extending half-way across said heads and forming a joint in direct alignment with the center line thereof, entering flanges D D, and a key, G, for securing the parts together, substantially as described.

WM. C. PARSELS.

Witnesses:
JOHN BLAKE,
WILLIAM W. LAMBERT.